United States Patent
Kim (10) Patent No.: US 7,792,202 B2
(45) Date of Patent: Sep. 7, 2010

(54) APPARATUS AND METHOD FOR ESTIMATING TIMING OFFSET OF OFDM SYMBOL, AND METHOD OF RECOVERING SYMBOL TIMING OF OFDM SYMBOL

(75) Inventor: Beom-Kon Kim, Suwon-si (KR)

(73) Assignee: Samsung Electronics Co., Ltd., Suwon-si, Gyeonggi-do (KR)

( * ) Notice: Subject to any disclaimer, the term of this patent is extended or adjusted under 35 U.S.C. 154(b) by 847 days.

(21) Appl. No.: 11/669,528

(22) Filed: Jan. 31, 2007

(65) Prior Publication Data

US 2008/0181317 A1 Jul. 31, 2008

(51) Int. Cl.
*H04K 1/10* (2006.01)
*H04L 27/28* (2006.01)

(52) U.S. Cl. .................................. 375/260
(58) Field of Classification Search ............ 375/260
See application file for complete search history.

(56) References Cited

U.S. PATENT DOCUMENTS

| 5,732,113 A * | 3/1998 | Schmidl et al. ............ 375/355 |
| 2010/0027723 A1 * | 2/2010 | Kim et al. ................... 375/343 |

FOREIGN PATENT DOCUMENTS

| JP | 2000-06891 | 3/2000 |
| JP | 2000-151546 | 5/2000 |
| KR | 1020060004729 | 1/2006 |
| KR | 1020050063154 | 6/2006 |

OTHER PUBLICATIONS van de Beek, J.J.; Sandell, M.; Borjesson, P.O.; "ML estimation of time and frequency offset in OFDM systems," IEEE Transactions on Signal Processing, vol. 45 , Issue: 7, 1997 , pp. 1800-1805.*
Tureli, U.; Liu, H.; Zoltowski, M.D.; "OFDM blind carrier offset estimation: ESPRIT," IEEE Transactions on Communications, vol. 48 , Issue: 9, 2000 , pp. 1459-1461.*
English Abstract for Publication No. 2000-068971.
English Abstract for Publication No. 2000-151546.
English Abstract for Publication No. 1020050063154.
English Abstract for Publication No. 1020060004729.

* cited by examiner

*Primary Examiner*—David C. Payne
*Assistant Examiner*—Nader Bolourchi
(74) *Attorney, Agent, or Firm*—F. Chau & Associates, LLC (57) ABSTRACT

An apparatus for estimating a timing offset of each of orthogonal frequency division multiplexing (OFDM) symbols that are fast Fourier transform (FFT)-processed. A first correlator calculates correlation values and outputs a first correlation signal. A second correlator calculates correlation values and outputs a second correlation signal. A third correlator calculates a correlation value and outputs a third correlation signal. A delay correlator calculates a correlation value and outputs a timing offset information signal. A phase estimator detects phase components of the timing offset information signal and a sliding integrator accumulates the detected phase components of the timing offset information signal during a symbol interval and outputs an average value of the accumulated phase components during the symbol interval as the timing offset of each OFDM symbol.

20 Claims, 5 Drawing Sheets

FIG. 5

# APPARATUS AND METHOD FOR ESTIMATING TIMING OFFSET OF OFDM SYMBOL, AND METHOD OF RECOVERING SYMBOL TIMING OF OFDM SYMBOL

BACKGROUND OF THE INVENTION

1. Field of the Invention

The present disclosure relates to orthogonal frequency division multiplexing (OFDM), and more particularly, to an apparatus and method for estimating timing offset of OFDM symbols and a method of recovering symbol timing of OFDM symbols.

2. Discussion of the Related Art

Many digital audio broadcasting (DAB) systems, digital multimedia broadcasting (DMB) systems, wireless local area network (WLAN) systems and the like use an orthogonal frequency division multiplexing (OFDM) communication method wherein, data is transmitted using a plurality of orthogonal subcarriers.

Figure 1:
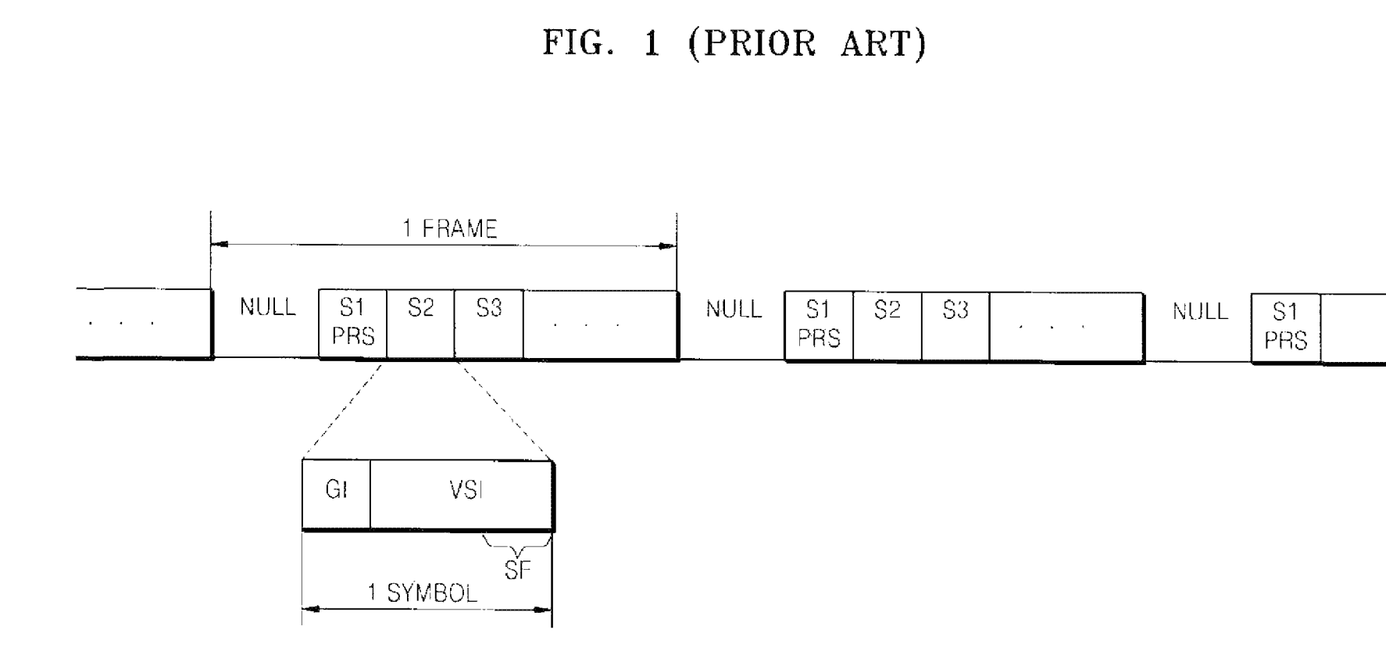
FIG. 1 shows a conventional frame structure having orthogonal frequency division multiplexing (OFDM) symbols.

FIG. 1 shows a conventional frame structure of OFDM symbols. Referring to FIG. 1, each frame comprises a plurality of OFDM symbols S1, S2, S3, . . . . A NULL symbol is placed at the beginning of each frame. A first OFDM symbol S1 of each frame is a preamble symbol. The preamble symbol includes reference information on the OFDM symbols of each frame. In particular, DAB systems use a phase reference symbol (PRS) as a preamble symbol.

Each symbol interval is divided into a guard interval (GI) and a valid symbol interval (VSI). A copy of a final predetermined portion SF of the VSI is inserted into the GI to prevent inter-symbol interference (ISI).

Figure 2:
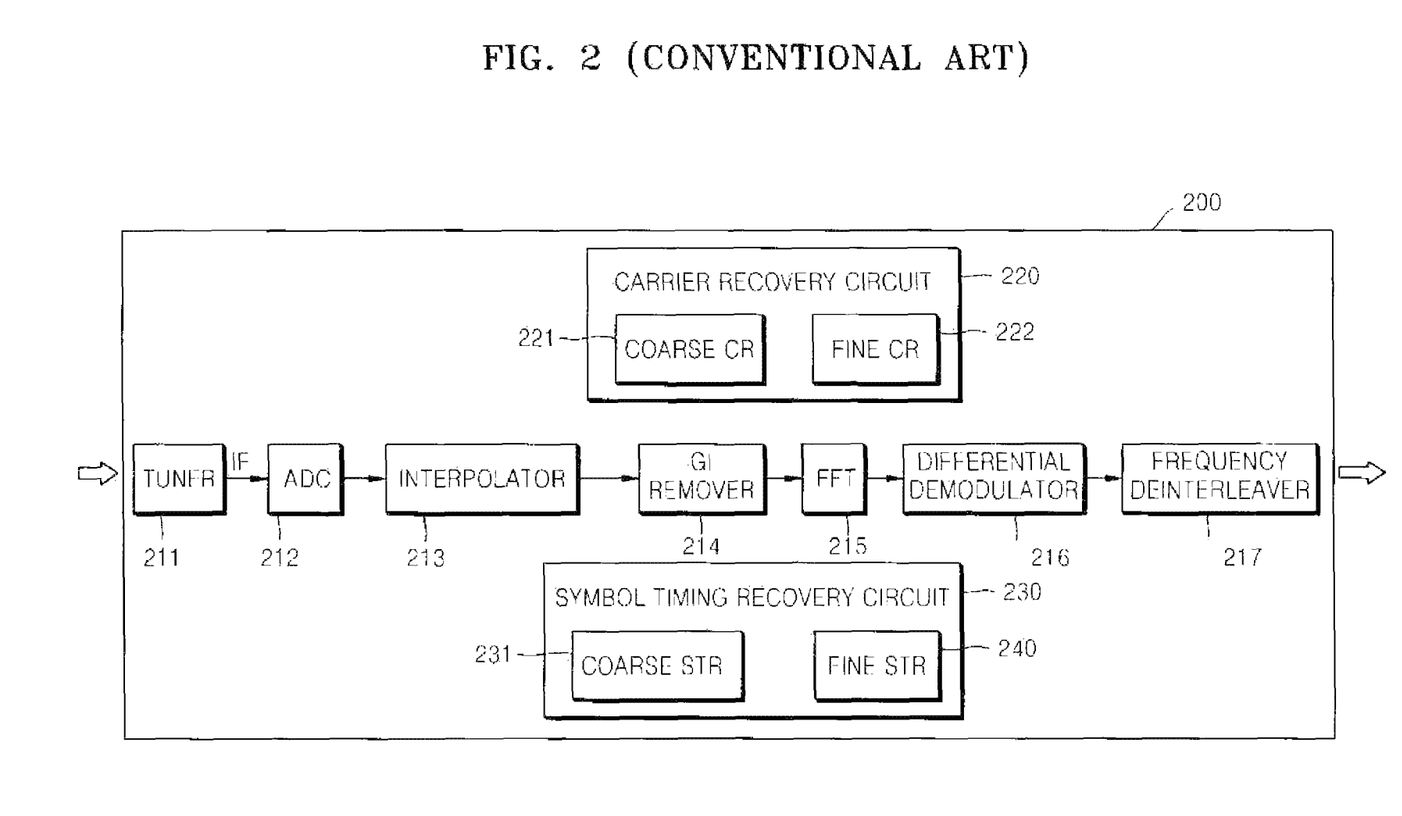
FIG. 2 is a block diagram of a conventional receiver used by an OFDM communication method.

FIG. 2 is a block diagram of a conventional receiver 200 used by the OFDM communication method. Referring to FIG. 2, a tuner 211 converts a signal received through an antenna (not shown) into an analog intermediate frequency (IF) band signal. An analog-to-digital converter (ADC) 212 converts the analog IF band signal into a digital signal. An interpolator 213 performs interpolation processing on symbol data received from the ADC 212 based on an interpolation frequency clock. A GI remover 214 removes a GI from each OFDM symbol and sends only valid symbols to a fast Fourier transform (FFT) block 215. A differential demodulator 216 performs differential demodulation on symbols which have been FFT-processed by the FFT block 215. A frequency deinterleaver 217 deinterleaves signals that have been output by the differential demodulator 216 and transfers the deinterleaved signals to a subsequent processing block (not shown).

The receiver 200 used by the OFDM communication method performs carrier frequency synchronization and symbol synchronization in order to exactly recover received OFDM symbols.

A carrier frequency error (carrier frequency offset) occurs due to a difference between the frequency of an oscillator used by a transmitter and the frequency of an oscillator used by the receiver 200. Each OFDM symbol comprises a plurality of adjacent subcarriers. Therefore, a small carrier frequency error can greatly influence the recovery of each OFDM symbol. To remove the carrier frequency error and perform the carrier frequency synchronization, the receiver 200 comprises a carrier recovery circuit 220. The carrier recovery circuit 220 comprises a coarse carrier recovery block 221 for compensating for an integral multiple frequency error and a fine carrier recovery block 222 for compensating for a decimal multiple frequency error.

A symbol timing recovery circuit 230 for carrying out the symbol synchronization finds an exact starting point of each OFDM symbol to perform an exact FFT process. The symbol timing recovery circuit 230 comprises a coarse symbol timing recovery block 231 for compensating for an integral multiple timing error and a fine symbol timing recovery block 240 for compensating for a decimal multiple timing error.

The OFDM communication method uses carrier recovery technology for performing the carrier frequency synchronization and symbol timing recovery technology for performing the symbol synchronization.

SUMMARY OF THE INVENTION

Exemplary embodiments of the present invention provide an apparatus and method for precisely estimating a timing offset of each of a plurality of orthogonal frequency division multiplexing (OFDM) symbols based on correlation values between received OFDM symbols and a reference OFDM symbol.

A method of recovering timing of each OFDM symbol based on an exactly estimated timing offset of each OFDM symbol is also provided.

According to an aspect of an exemplary embodiment of the present invention, an apparatus for estimating a timing offset of each of a plurality of orthogonal frequency division multiplexing (OFDM) symbols that are fast Fourier transform (FFT)-processed is provided. The apparatus includes a first correlator that calculates correlation values between a first OFDM symbol and subsequent OFDM symbols and outputs a first correlation signal. A second correlator calculates correlation values between a reference OFDM symbol and subsequent OFDM symbols and outputs a second correlation signal. A third correlator calculates a correlation value between the first correlation signal and the second correlation signal and outputs a third correlation signal. A delay correlator calculates a correlation value between a delay correlation signal obtained by delaying the third correlation signal by a predetermined subcarrier interval and the third correlation signal. The delay correlator outputs a timing offset information signal. A phase estimator detects phase components of the timing offset information signal. A sliding integrator accumulates the detected phase components of the timing offset information signal during a symbol interval and outputs an average value of the accumulated phase components during the symbol interval as the timing offset of each OFDM symbol.

The timing offset of each OFDM symbol is output.

The first OFDM symbol is a preamble symbol including reference information on OFDM symbols of a frame.

The preamble symbol is a phase reference symbol (PRS) when the apparatus for estimating the timing offset is applied to a receiver of a digital audio broadcasting (DAB) system.

The reference OFDM symbol is a PRS previously determined by a transmitter and a receiver.

The predetermined subcarrier interval is determined according to the range of estimation of the timing offset.

The apparatus further includes a buffer that stores the first OFDM symbol and sends the first OFDM symbol to the first correlator. A reference OFDM symbol generator generates the reference OFDM symbol and sends the reference OFDM symbol to the second correlator.

The apparatus further includes a demultiplexer that sends the first OFDM symbol among received OFDM symbols of a frame to the buffer and sends subsequent OFDM symbols to the first correlator and the second correlator.

According to another exemplary embodiment of the present invention, a method of estimating a timing offset of each of a plurality of FFT-processed OFDM symbols of a frame is provided. The method includes calculating correlation values between a first OFDM symbol and subsequent OFDM symbols and a first correlation signal is generated. Correlation values are calculated between a reference OFDM symbol and the subsequent OFDM symbols and a second correlation signal is generated. A correlation value is calculated between the first correlation signal and the second correlation signal and a third correlation signal is generated. A correlation value is calculated between a delay correlation signal obtained by delaying the third correlation signal by a predetermined subcarrier interval and the third correlation signal, and a timing offset information signal is generated. Phase components of the timing offset information signal are accumulated during a symbol interval and an average value of the accumulated phase components are output during the symbol interval as the timing offset of each OFDM symbol.

According to another exemplary embodiment of the present invention, a symbol timing recovering method includes outputting a timing offset of each OFDM symbol using the method of estimating the timing offset. The timing offset of each OFDM symbol is input into a numerically controlled oscillator (NCO), and an interpolation frequency clock corresponding to the timing offset of each OFDM symbol is generated. Interpolation-processing is performed on input symbol data based on the interpolation frequency clock.

BRIEF DESCRIPTION OF THE DRAWINGS

The above and other features of the present disclosure will become more apparent by describing in detail exemplary embodiments of the present invention with reference to the attached drawings in which.

DETAILED DESCRIPTION OF THE EXEMPLARY EMBODIMENTS

Exemplary embodiments of the present invention will now be described more fully with reference to the accompanying drawings. The invention may, however, be embodied in many different forms and should not be construed as being limited to the embodiments set forth herein.

Figure 3:
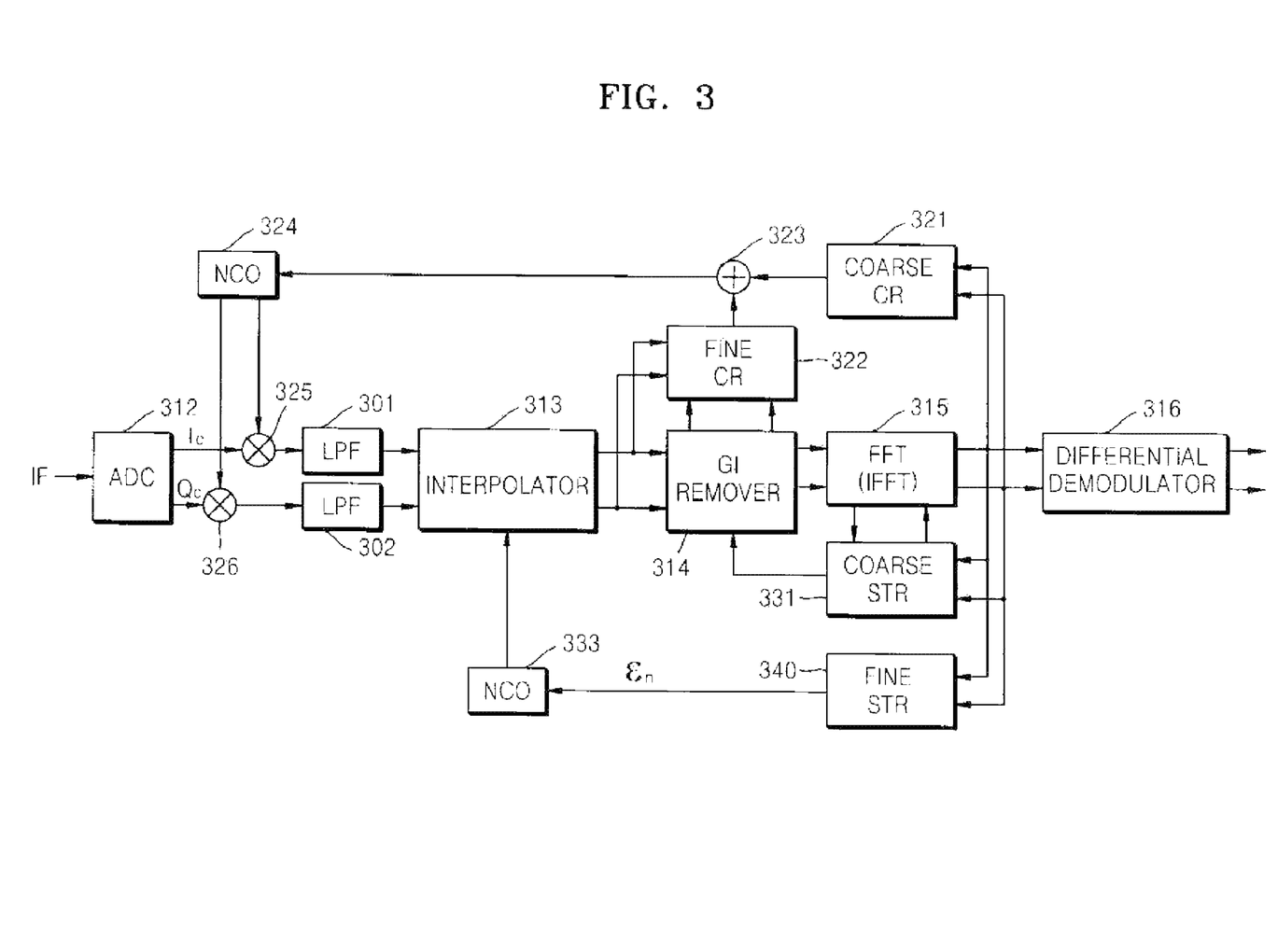
FIG. 3 is a block diagram of a receiver used by an OFDM communication method to which a timing offset estimating apparatus, according to an embodiment of the present invention, is applicable.

FIG. 3 is a block diagram of a receiver used by an orthogonal frequency division multiplexing (OFDM) communication method according to an exemplary embodiment of the present invention. The method is applied to a timing offset estimating apparatus. The timing offset estimating apparatus, according to an exemplary embodiment of the present invention, can be included in a line symbol timing recovery block 340 illustrated in FIG. 3 and will be described with reference to FIGS. 4 and 5.

Referring to FIG. 3, the receiver comprises an analog-to-digital converter (ADC) 312, an interpolator 313, a guard interval (GI) remover 314, a fast Fourier transform (FFT) block 315, and a differential demodulator 316, which respectively correspond to the ADC 212, the interpolator 213, the GI remover 214, the FFT block 215, and the differential demodulator 216 illustrated in FIG. 2. Signals output by the ADC 312 are divided into an in-phase component (Ic) and a quadrature component (Qc).

A coarse carrier recovery block 321, a fine carrier recovery block 322, an adder 323, a numerically controlled oscillator (NCO) 324, an in-phase multiplier 325, and a quadrature multiplier 326 serve as a carrier recovery circuit. A coarse symbol timing recovery block 331, the fine symbol timing recovery block 340, and an NCO 333 serve as a symbol timing recovery circuit.

A carrier recovery signal that is a combination of a signal output by the coarse carrier recovery block 321 and a signal output by the fine carrier recovery block 322 is input into the NCO 324. The NCO 324 sends a carrier frequency clock, corresponding to the carrier recovery signal, to the in-phase multiplier 325 and the quadrature multiplier 326 to remove a carrier frequency error. An in-phase low pass filter (LPF) 301 and a quadrature LPF 302 are used as an image rejection filter to reject an image frequency signal included in the output signal of the ADC 312.

The coarse symbol timing recovery block 331 receives OFDM symbols that are FFT-processed by the FFT block 315 and finds an exact starting point of each OFDM symbol in order to perform an exact FFT process. When an inverse fast Fourier transform (IFFT) is required to perform a coarse symbol timing recovery, the FFT block 315 can serve as an IFFT block as illustrated. A fine coarse symbol timing recovery performs a more line and exact symbol timing recovery than the coarse symbol timing recovery alone. The fine symbol timing recovery block 340 comprises the timing offset estimating apparatus that estimates a timing offset of each OFDM symbol based on the FFT-processed OFDM symbols. The NCO 333 receives a timing offset $\epsilon_n$ of each OFDM symbol from the fine symbol timing recovery block 340 and generates an interpolation frequency clock corresponding to the timing offset $\epsilon_n$ of each OFDM symbol. The interpolator 313 interpolation processes symbol data received from the in-phase LPF 301 and the quadrature LPF 302 based on the interpolation frequency clock received from the NCO 333.

The timing offset estimating apparatus according to an exemplary embodiment of the present invention will be described with reference to FIGS. 4 and 5.

Figure 4:
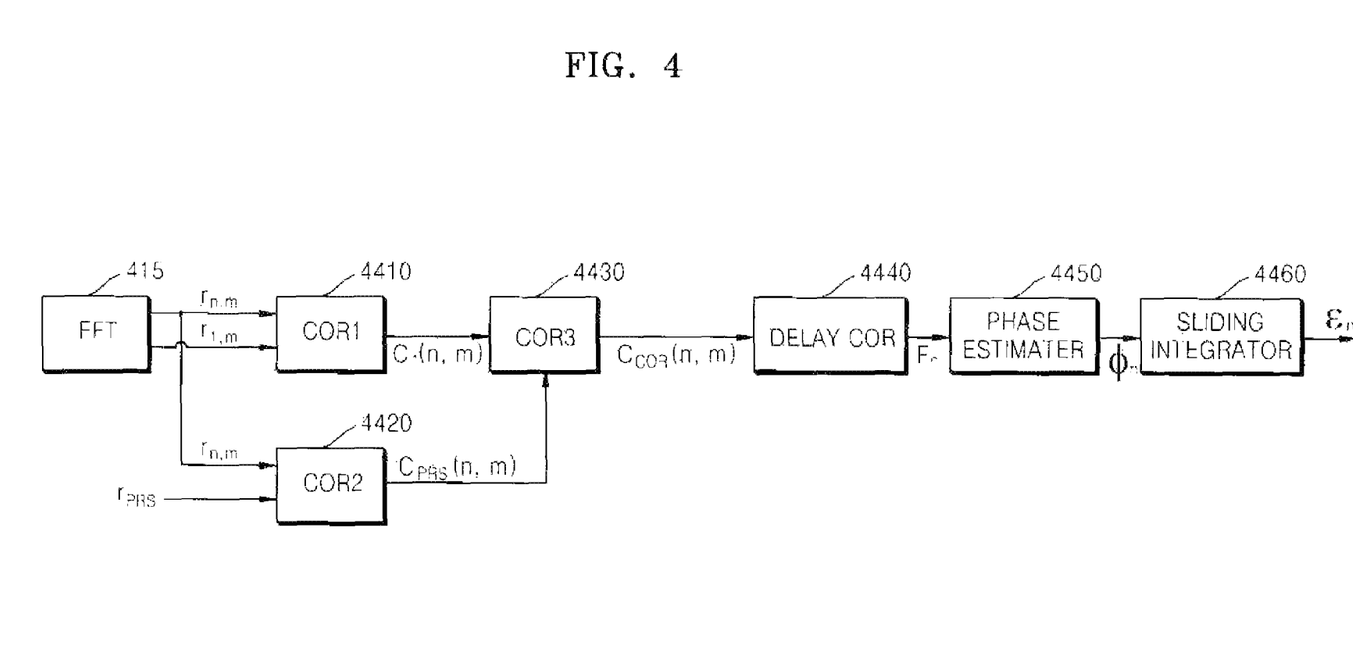
FIG. 4 is a block diagram of a timing offset estimating apparatus according to an embodiment of the present invention.

FIG. 4 is a block diagram of the timing offset estimating apparatus according to an exemplary embodiment of the present invention. Referring to FIG. 4, the timing offset estimating apparatus comprises a FFT block 415, a first correlator 4410, a second correlator 4420, a third correlator 4430, a delay correlator 4440, a phase estimator 4450, and a sliding integrator 4460. As used herein, "n" denotes a symbol index and "m" denotes a subcarrier index.

The first correlator 4410 calculates correlation values between a first OFDM symbol $r_{1,m}$ and subsequent OFDM symbols $r_{n,m}$ and outputs a first correlation signal $C_1(n,m)$. For example, the first correlator 4410 calculates a correlation value between the first OFDM symbol $r_{1,m}$ and a second OFDM symbol $r_{2,m}$ and outputs the first correlation signal $C_1(2,m)$. A correlation value between the first OFDM symbol and a third OFDM symbol $r_{3,m}$ is calculated. The first correlation signal $C_1(3,m)$ is output. A correlation value between the first OFDM symbol $r_{1,m}$ and a fourth OFDM symbol $r_{4,m}$ is calculated. The first correlation signal $C_1(4,m)$ is output.

The first OFDM symbol $r_{1,m}$ is a preamble symbol including reference information on each of the OFDM symbols of a frame. The timing offset estimating apparatus according to the present exemplary embodiment of the present invention can be employed in a digital audio broadcasting (DAB) system, a digital multimedia broadcasting (DMB) system, a wireless local area network (WLAN) system and the like. A phase reference symbol (PRS) is the preamble symbol in the DAB system that employs the timing offset estimating apparatus according to the present exemplary embodiment.

The second correlator 4420 calculates correlation values between a reference OFDM symbol $r_{PRS}$ and the subsequent OFDM symbols $r_{n,m}$ and outputs a second correlation signal $C_{PRS}(n,m)$. For example, the second correlator 4420 calculates a correlation value between the reference OFDM symbol $r_{PRS}$ and the second OFDM symbol $r_{2,m}$ and outputs the second correlation signal $C_{PRS}(2,m)$. The second correlator 4420 calculates a correlation value between the reference OFDM symbol $r_{PRS}$ and the third OFDM symbol $r_{3,m}$ and outputs the second correlation signal $C_{PRS}(3,m)$. The second correlator 4420 calculates a correlation value between the reference OFDM symbol $r_{PRS}$ and the fourth OFDM symbol $r_{4,m}$ and outputs the second correlation signal $C_{PRS}(4,m)$.

The reference OFDM symbol $r_{PRS}$ is a PRS previously determined by a transmitter and a receiver. The second correlator 4420 can receive the reference phase symbol $r_{PRS}$ from a reference OFDM symbol generator (see 570 in FIG. 5) included in the receiver. As used herein, "$r_{1,m}$" denotes a PRS received by the receiver and "$r_{PRS}$" denotes a PRS generated by the receiver.

The third correlator 4430 calculates a correlation value between the first correlation signal $C_1(n,m)$ and the second correlation signal $C_{PRS}(n,m)$ and outputs a third correlation signal $C_{COR}(n,m)$.

Figure 5:
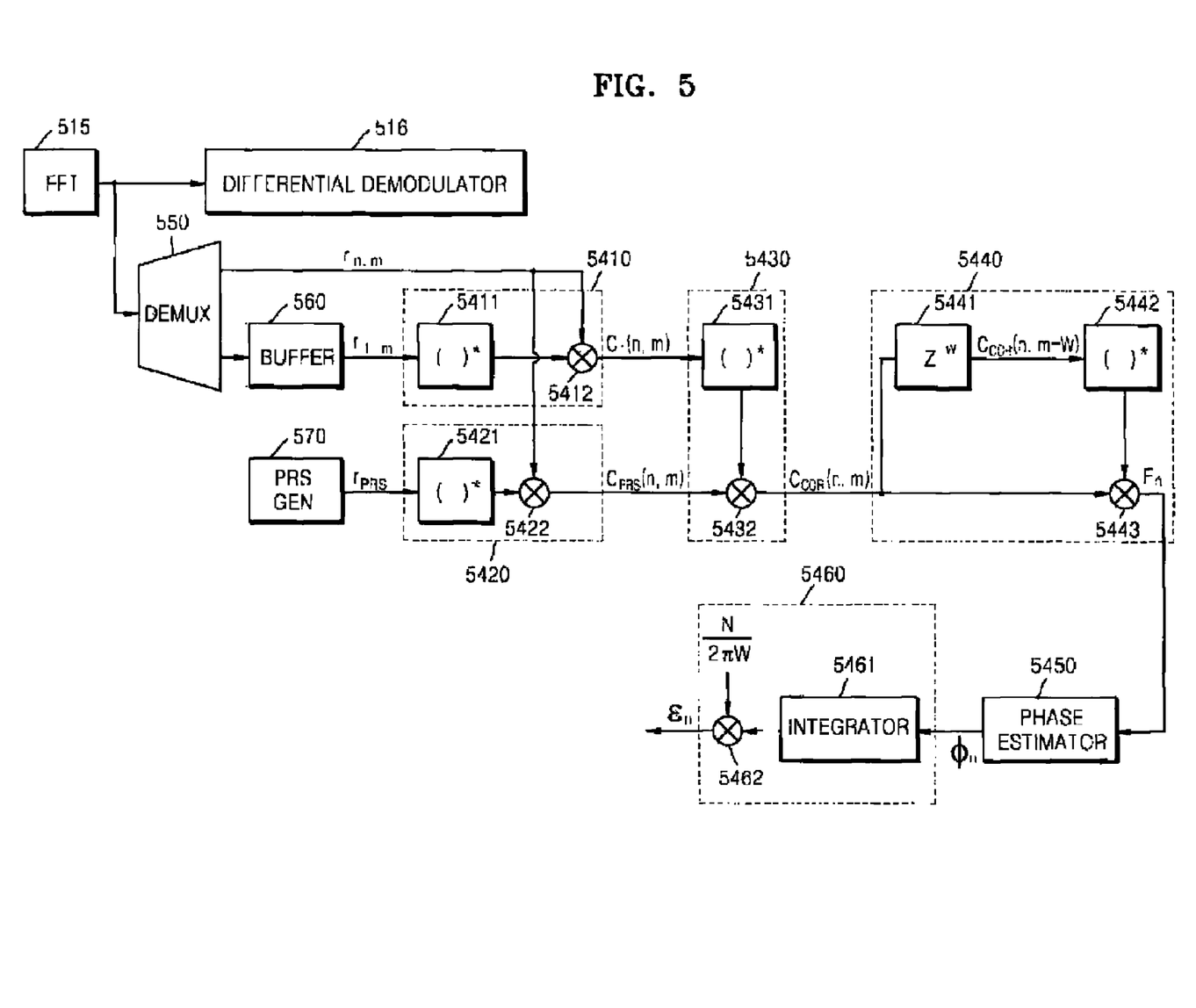
FIG. 5 is a detailed block diagram of the timing offset estimating apparatus illustrated in FIG. 4.

The delay correlator 4440 calculates a correlation value between a delay correlation signal (see $C_{COR}(n,m-W)$ in FIG. 5) obtained by delaying the third correlation signal $C_{COR}(n,m)$ by a predetermined subcarrier interval W and the third correlation signal $C_{COR}(n,m)$, and outputs a timing offset information signal Fn. The predetermined subcarrier interval W is determined according to the range of estimation of the timing offset. In detail, the range of estimation of the timing offset can be varied according to the predetermined subcarrier interval W.

The phase estimator 4450 detects phase components φn of the timing offset information signal Fn received from the delay correlator 4440.

The sliding integrator 4460 accumulates the detected phase components φn of the timing offset information signal Fn during a symbol interval, and outputs an average value of the accumulated phase components during the symbol interval as the timing offset $\epsilon_n$ of each OFDM symbol. The timing offset $\epsilon_n$ of each OFDM symbol output by the sliding integrator 4460 can be input into the NCO 333 and is a basis for the fine symbol timing recovery.

FIG. 5 is a detailed block diagram of the timing offset estimating apparatus illustrated in FIG. 4. Referring to FIG. 5, the timing offset estimating apparatus comprises a first correlator 5410, a second correlator 5420, a third correlator 5430, a delay correlator 5440, a phase estimator 5450, a sliding integrator 5460, a FFT block 515, a differential demodulator 516, a demultiplexer 550, a buffer 560, and a reference OFDM symbol generator 570.

The demultiplexer 550 receives OFDM symbols that are FFT-processed by the FFT block 515. The demultiplexer 550 sends the first OFDM symbol $r_{1,m}$ to the buffer 560 among the OFDM symbols of the frame and sends the subsequent OFDM symbols $r_{n,m}$ to the first correlator 5410 and the second correlator 5420. The buffer 560 stores the first OFDM symbol $r_{1,m}$ received from the demultiplexer 550 and sends the first OFDM symbol $r_{1,m}$ to the first correlator 5410. The reference OFDM symbol generator 570 generates the reference OFDM symbol $R_{PRS}$ and sends the reference OFDM symbol $r_{PRS}$ to the second correlator 5420.

The $m^{th}$ subcarrier data $s_{n,m}$ of an FFT-processed $n^{th}$ OFDM symbol is expressed in Equation 1 below. A transfer function $H_{n,m}$ of a transmission channel including a multiple path is expressed in Equation 2 below The OFDM symbols $r_{n,m}$ output from the FFT block 515 to the demultiplexer 550 is expressed in Equation 3 below and can be derived from equations 1 and 2.

$$s_{n,m} = |s_{n,m}| \cdot e^{-j\phi_{n,m}} \tag{1}$$

$$H_{n,m} = |H_{n,m}| \cdot e^{-j\varsigma_{n,m}} \tag{2}$$

$$r_{n,m} = |s_{n,m}| \cdot |H_{n,m}| \cdot e^{-j(\phi_{n,m}+\varsigma_{n,m}+\frac{2\pi m\epsilon}{N})} + N_{n,m} \tag{3}$$

wherein, $\phi_{n,m}$ denotes phase information on the $m^{th}$ subcarrier data $s_{n,m}$ of the FFT-processed $n^{th}$ OFDM symbol, $\varsigma_{n,m}$ denotes delay information on the transmission channel, $(2\pi m\epsilon/N)$ denotes information on the timing offset $\epsilon$, and $N_{n,m}$ denotes noise. N of the $(2\pi m\epsilon/N)$ denotes the number of all FFT points.

Referring to Equation 3, the first OFDM symbol $r_{1,m}$ stored in the buffer 560 is expressed in Equation 4 below.

$$r_{1,m} = |s_{1,m}| \cdot |H_{1,m}| \cdot e^{-j(\phi_{1,m}+\varsigma_{1,m}+\frac{2\pi m\epsilon}{N})} + N_{1,m} \tag{4}$$

The reference OFDM symbol $r_{PRS}$ generated by the reference OFDM symbol generator 570 is expressed in Equation 5 below.

$$r_{PRS} = |s_{1,m}| \cdot e^{-j\cdot\phi_{1,m}} \tag{5}$$

The reference OFDM symbol $r_{PRS}$ is generated by the reference OFDM symbol generator 570 and thus is not related to the transmission channel. Therefore, the reference OFDM symbol $r_{PRS}$ includes size information $|S_{1,m}|$ and the phase information $\phi_{n,m}$.

The first correlator 5410 comprises a conjugation unit 5411 and a multiplication unit 5412. The conjugation unit 5411 receives the first OFDM symbol $r_{1,m}$ from the buffer 560 and outputs a conjugation complex signal of the first OFDM symbol $r_{1,m}$. The multiplication unit 5412 multiplies the conjugation complex signal of the first OFDM symbol $r_{1,m}$ and subsequent OFDM symbols $r_{n,m}$ and outputs the first correlation signal $C_1(n,m)$. Referring to Equations 3 and 4, the first correlation signal $C_1(n,m)$ can be expressed in Equation 6 below.

$$C_1(n,m) = \tag{6}$$
$$r_{n,m} \otimes r_{1,m}^* = |s_{1,m} \cdot s_{n,m}| \cdot |H_{1,m} \cdot H_{n,m}| \cdot e^{-j(\phi_{n,m}-\phi_{1,m}+\varsigma_{n,m}-\varsigma_{1,m})} + N'_{n,m}$$

wherein, $N'_{n,m}$ denotes a coarse component including noise.

The second correlator 5420 comprises a conjugation unit 5421 and a multiplication unit 5422. The conjugation unit 5421 receives the reference OFDM symbol $r_{PRS}$ and outputs a conjugation complex signal of the reference OFDM symbol $r_{PRS}$. The multiplication unit 5422 multiplies the conjugation complex signal of the reference OFDM symbol $r_{PRS}$ and subsequent OFDM symbols $r_{n,m}$ and outputs the second correlation signal $C_{PRS}(n,m)$. Referring to Equations 3 and 5, the second correlation signal $C_{PRS}(n,m)$ can be expressed in Equation 7 below.

$$C_{PRS}(n, m) = \tag{7}$$
$$r_{n,m} \otimes r_{PRS}^* = |s_{1,m} \cdot s_{n,m}| \cdot |H_{n,m}| \cdot e^{-j(\phi_{n,m} - \phi_{1,m} + \varsigma_{n,m} + \frac{2\pi m \varepsilon}{N})} + N'_{n,m}$$

wherein, $N'_{n,m}$ denotes a coarse component including noise.

The third correlator 5430 comprises a conjugation unit 5431 and a multiplication unit 5432. The conjugation unit 5431 receives the first correlation signal $C_1(n,m)$ and outputs a conjugation complex signal of the first correlation signal $C_1(n,m)$. The multiplication unit 5432 multiplies the conjugation complex signal of the first correlation signal $C_1(n,m)$ and the second correlation signal $C_{PRS}(n,m)$ and outputs the third correlation signal $C_{COR}(n,m)$. Referring to Equations 6 and 7, the third correlation signal $C_{COR}(n,m)$ can be expressed in Equation 8 below.

$$C_{COR}(n, m) = C_{PRS}(n, m) \otimes C_1^*(n, m) = \tag{8}$$
$$|s_{1,m} \cdot s_{n,m}|^2 \cdot |H_{1,m}|^2 \cdot |H_{n,m}|^2 \cdot e^{-j(\varsigma_{1,m} + \frac{2\pi m \varepsilon}{N})} + N'_{n,m}$$

wherein $N'_{n,m}$ denotes a coarse component including noise.

In Equation 8, a phase component of third correlation signal $C_{COR}(n,m)$ is a combination of a component $\varsigma_{1,m}$ of a delayed transmission channel and a component $2\pi m\varepsilon/N$ of the timing offset $\varepsilon$. The component $\varsigma_{1,m}$ of the delayed transmission channel is removed to detect only the component $2\pi m\varepsilon/N$ of the timing offset $\varepsilon$. The delay correlator 5440 removes the component $\varsigma_{1,m}$ of the delayed transmission channel.

The delay correlator 5440 comprises a delay unit 5441, a conjugation unit 5442, and a multiplication unit 5443. The delay unit 5441 outputs the delay correlation signal $C_{COR}(n, m-W)$ obtained by delaying the third correlation signal $C_{COR}(n,m)$ by the predetermined subcarrier interval W. The conjugation unit 5442 outputs a conjugation complex signal of the delay correlation signal $C_{COR}(n,m-W)$. The multiplication unit 5443 multiplies the conjugation complex signal of the delay correlation signal $C_{COR}(n,m-W)$ and the third correlation signal $C_{COR}(n,m)$, and outputs the timing offset information signal Fn.

The delay correlation signal $C_{COR}(n,m-W)$ can be expressed as follows:

$$C_{COR}(n, m - w) = \tag{9}$$
$$|s_{1,m-w} \cdot s_{n,m-w}|^2 \cdot |H_{1,m-w}|^2 \cdot |H_{n,m-w}|^2 \cdot e^{-j(\varsigma_{1,m-w} + \frac{2\pi(m-w)\varepsilon}{N})} + N'_{n,m-w}$$

The timing offset information signal Fn can be expressed as follows:

$$Fn = C_{COR}(n, m) \otimes C_{COR}^*(n, m - w) \tag{10}$$
$$= |Fn - N''''_{n,m}| \cdot e^{-j(\varsigma_{1,m} + \frac{2\pi m\varepsilon}{N} - \varsigma_{1,m-w} - \frac{2\pi(m-w)\varepsilon}{N})} + N''''_{n,m}$$
$$= |Fn - N''''_{n,m}| \cdot e^{-j(\varsigma_{1,m} - \varsigma_{1,m-w} + \frac{2\pi w\varepsilon}{N})} + N''''_{n,m}$$

Referring to Equations 8 and 9, Equation 10 satisfies that $$|Pn| = |s_{1,m} \cdot s_{n,m} \cdot s_{1,m-W} \cdot s_{n,m-W}|^2 \cdot |H_{1,m} \cdot H_{1,m-W}| \cdot |H_{n,m} \cdot H_{n,m-W}|^2$$

The delay characteristics of the transmission channel during a symbol interval remain almost constant. For example, the delay characteristics of the transmission channel during a symbol interval remain substantially invariable to influence the estimation of the timing offset. Therefore, in Equation 10, $\varsigma_{1,m} - \varsigma_{1,m-W} \approx 0$. Therefore, the delay correlator 5440 removes the component of the delayed transmission channel from the phase component of the third correlation signal $C_{COR}(n,m)$.

The phase estimator 5450 detects phase components $\phi n$ of the timing offset information signal Fn. Since the noise component $N''''_{n,m}$ of Equation 10 has random characteristics, its average value is close to 0. The phase components $\phi n$ of the timing offset information signal Fn are expressed as follows:

$$\phi_n = \frac{2\pi w \varepsilon}{N} \tag{11}$$

However, when the phase estimator 5450 estimates the phase components $\phi n$ of the timing offset information signal Fn, an instant estimation error can occur according to the environment of the transmission channel. To prevent the instant estimation error, the sliding integrator 5460 accumulates the phase components $\phi n$ output by the phase estimator 5450 during a symbol interval, and outputs an average value of the accumulated phase components as the timing offset $\varepsilon_n$.

The sliding integrator 5460 comprises an integrator 5461 and a multiplier 5462. The integrator 5461 accumulates phase components $\phi n$ of the timing offset information signal Fn during a symbol interval. The multiplier 5462 outputs the average value obtained by multiplying the accumulated phase components by an average constant $N/2\pi W$ as the timing offset $\varepsilon_n$ of each OFDM symbol.

The operation of the phase estimator 5450 and the sliding integrator 5460 can be explained as follows:

$$Yn = \frac{N}{2\pi W} \cdot \frac{1}{K-W} \sum_{m=-K/2, m\neq 0}^{K/2-W} \arg\left(|Pn| \cdot e^{-j(\varsigma_{1,m} - \varsigma_{1,m-w} + \frac{2\pi W\varepsilon}{N})} + N''''_{n,m}\right) \tag{12}$$
$$\approx \frac{N}{2\pi W} \cdot \frac{1}{K-W} \sum_{m=-K/2, m\neq 0}^{K/2-W} \arg\left(|Pn| \cdot e^{-j\frac{2\pi W\varepsilon}{N}} + N''''_{n,m}\right)$$
$$\approx \varepsilon_n$$

As described above, $$|Pn| = |s_{1,m} \cdot s_{n,m} \cdot s_{1,m-W} \cdot s_{n,m-W}|^2 \cdot |H_{1,m} \cdot H_{1,m-W}| \cdot |H_{n,m} \cdot H_{n,m-W}|^2$$

In Equation 12, Yn denotes a signal output by the phase estimator 5450 and the sliding integrator 5460. In Equation 12, K denotes the number of transmitted subcarriers. In the DAB system, K=1536. However, K may also have other values according to the specifications of the DAB system.

A timing offset estimating method according to an exemplary embodiment of the present invention will now be described.

Among FFT-processed OFDM symbols of a frame, correlation values between the first OFDM symbol $r_{1,m}$ and subsequent OFDM symbols $r_{n,m}$ are calculated, and a first correlation signal $C_1(n,m)$ is generated. The first OFDM symbol $r_{1,m}$ is a preamble symbol including reference information on each of the OFDM symbols of a frame. In particular, a PRS is the preamble symbol in the DAB system.

Correlation values between a reference OFDM symbol $r_{PRS}$ and subsequent OFDM symbols $r_{n,m}$ are calculated and a second correlation signal $C_{PRS}(n,m)$ is generated. The reference OFDM symbol $r_{PRS}$ is a PRS previously determined by a transmitter and a receiver. The first OFDM symbol $r_{1,m}$ denotes a PRS received by the receiver from the transmitter. The reference OFDM symbol $r_{PRS}$ denotes a PRS generated by the receiver.

A correlation value between the first correlation signal $C_1(n,m)$ and the second correlation signal $C_{PRS}(n,m)$ is calculated, and a third correlation signal $C_{COR}(n,m)$ is generated.

A correlation value between a delay correlation signal $C_{COR}(n,m-W)$ obtained by delaying the third correlation signal $C_{COR}(n,m)$ by a predetermined subcarrier interval W and the third correlation signal $C_{COR}(n,m)$ is calculated and a timing offset information signal Fn is generated. The predetermined subcarrier interval W is determined according to the range of estimation of the timing offset.

Phase components $\phi n$ of the timing offset information signal Fn are accumulated during a symbol interval and an average value of the accumulated phased components is output as the timing offset $\epsilon_n$ of each OFDM symbol. According to the timing offset estimating method of the present exemplary embodiment, the timing offset $\epsilon_n$ of each OFDM symbol can be output by symbols rather than by frames.

A symbol liming recovering method including the timing offset estimating method according to the present exemplary embodiment will now be described with reference to FIG. 3.

The timing offset $\epsilon_n$ of each OFDM symbol is output using the timing offset estimating method, which is performed by the fine symbol timing recovery block 340.

The timing offset $\epsilon_n$ of each OFDM symbol is input into the NCO 333, and an interpolation frequency clock corresponding to the timing offset $\epsilon_n$ of each OFDM symbol is generated.

Input symbol data is interpolation processed based on the interpolation frequency clock, which is performed by the interpolator 313. Other operations of the symbol timing recovering method can be understood by one of ordinary skill in the pertinent art.

According to the exemplary embodiment of the present invention, a timing offset of each OFDM symbol can be precisely estimated. Further, fine and exact timing of each OFDM symbol can be recovered based on the estimated timing offset of each OFDM symbol.

While exemplary embodiments of the present invention have been particularly shown and described with reference to the figures, it will be understood by those of ordinary skill in the art that various changes in form and details may be made therein without departing from the spirit and scope of the present invention.

What is claimed is:

1. An apparatus for estimating a timing offset of each of a plurality of orthogonal frequency division multiplexing (OFDM) symbols that are fast Fourier transform (FFT)-processed, the apparatus comprising:
   a first correlator calculating correlation values between a first OFDM symbol of the plurality of OFDM symbols and subsequent OFDM symbols of the plurality of OFDM symbols and outputting a first correlation signal;
   a second correlator calculating correlation values between a reference OFDM symbol and the subsequent OFDM symbols and outputting a second correlation signal;
   a third correlator calculating a correlation value between the first correlation signal and the second correlation signal and outputting a third correlation signal;
   a delay correlator calculating a correlation value between a delay correlation signal obtained by delaying the third correlation signal by a predetermined subcarrier interval and the third correlation signal, and outputting a timing offset information signal;
   a phase estimator detecting phase components of the timing offset information signal; and
   a sliding integrator accumulating the detected phase components of the timing offset information signal during a symbol interval, and outputting an average value of the accumulated phase components during the symbol interval as the timing offset of each OFDM symbol of the plurality of OFDM symbols.

2. The apparatus of claim 1, wherein the timing offset of each OFDM symbol is output.

3. The apparatus of claim 1, wherein the first OFDM symbol is a preamble symbol including reference information on OFDM symbols of a frame.

4. The apparatus of claim 3, wherein the apparatus for estimating the timing offset is applied to a receiver of a digital audio broadcasting (DAB) system and the preamble symbol is a phase reference symbol (PRS).

5. The apparatus of claim 4, wherein the reference OFDM symbol is a PRS previously determined by a transmitter and a receiver.

6. The apparatus of claim 1, wherein the predetermined subcarrier interval is determined according to a range of estimation of the timing offset.

7. The apparatus of claim 1, further comprising:
   a buffer storing the first OFDM symbol and sending the first OFDM symbol to the first correlator; and
   a reference OFDM symbol generator generating the reference OFDM symbol and sending the reference OFDM symbol to the second correlator.

8. The apparatus of claim 7, further comprising:
   a demultiplexer sending the first OFDM symbol among received OFDM symbols of a frame to the buffer, and sending the subsequent OFDM symbols to the first correlator and the second correlator.

9. The apparatus of claim 1, wherein the first correlator comprises:
   a conjugation unit receiving the first OFDM symbol and outputting a conjugation complex signal of the first OFDM symbol; and
   a multiplication unit multiplying the conjugation complex signal of the first OFDM symbol and the subsequent OFDM symbols and outputting the first correlation signal.

10. The apparatus of claim 1, wherein the second correlator comprises:
    a conjugation unit receiving the reference OFDM symbol and outputting a conjugation complex signal of the reference OFDM symbol; and
    a multiplication unit multiplying the conjugation complex signal of the reference OFDM symbol and the subsequent OFDM symbols and outputting the second correlation signal.

11. The apparatus of claim 1, wherein the third correlator comprises:
    a conjugation unit receiving the first correlation signal and outputting a conjugation complex signal of the first correlation signal; and
    a multiplication unit multiplying the conjugation complex signal of the first correlation signal and the second correlation signal and outputting the third correlation signal.

12. The apparatus of claim 1, wherein the delay correlator comprises:

a delay unit, receiving the third correlation signal and outputting the delay correlation signal obtained by delaying the third correlation signal by the predetermined subcarrier interval;

a conjugation unit receiving the delay correlation signal and outputting a conjugation complex signal of the delay correlation signal; and a multiplication unit multiplying the conjugation complex signal of the delay correlation signal and the third correlation signal, and outputting the timing offset information signal.

13. The apparatus of claim 1, wherein the sliding integrator comprises:

an integrator accumulating the phase components of the timing offset information signal during the symbol interval; and a multiplier outputting the average value obtained by multiplying the accumulated phase components by an average constant as the timing offset of each OFDM symbol.

14. A method of estimating a timing offset of each of a plurality of OFDM symbols of a frame that are FFT-processed, the method comprising:

calculating correlation values between a first OFDM symbol of the plurality of OFDM symbols and subsequent OFDM symbols of the plurality of OFDM symbols and generating a first correlation signal;

calculating correlation values between a reference OFDM symbol and the subsequent OFDM symbols and generating a second correlation signal;

calculating a correlation value between the first correlation signal and the second correlation signal and generating a third correlation signal;

calculating a correlation value between a delay correlation signal obtained by delaying the third correlation signal by a predetermined subcarrier interval and the third correlation signal, and generating a timing offset information signal; and accumulating phase components of the timing offset information signal during a symbol interval, and outputting an average value of the accumulated phase components during the symbol interval as the timing offset of each OFDM symbol of the plurality of OFDM symbols.

15. The method of claim 14, wherein the first OFDM symbol is a preamble symbol including reference information on the plurality of OFDM symbols of the frame.

16. The method of claim 15, wherein, the method of estimating the timing offset is applied to a DAB system, the preamble symbol is a phase reference symbol (PRS), and the reference OFDM symbol is a PRS previously determined by a transmitter and a receiver.

17. The method of claim 16, wherein the preamble symbol is a PRS received by the receiver from the transmitter, and the reference OFDM symbol is a PRS generated in the receiver.

18. The method of claim 14, wherein the predetermined subcarrier interval is determined according to a range of estimation of the timing offset.

19. The method of claim 14, wherein the timing offset of each OFDM symbol is output.

20. A method for recovering symbol timing, comprising:

outputting a timing offset of each of a plurality of OFDM symbols using the method of estimating the timing offset of claim 14;

inputting the timing offset of each OFDM symbol into a numerically controlled oscillator (NCO), and generating an interpolation frequency clock corresponding to the timing offset of each OFDM symbol; and interpolation-processing input symbol data based on the interpolation frequency clock.

* * * * *